(No Model.)
G. H. F. SCHRADER.
TIRE OR LIKE VALVE.
No. 565,573. Patented Aug. 11, 1896.
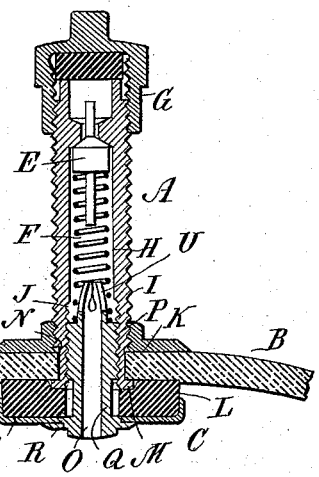
FIG. 1.
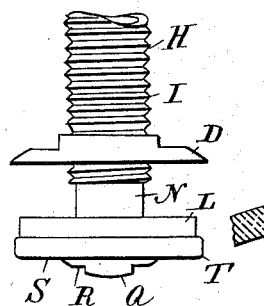
FIG. 2.
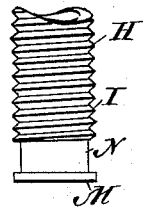
FIG. 3.
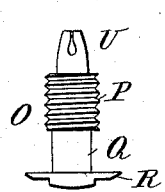
FIG. 4.
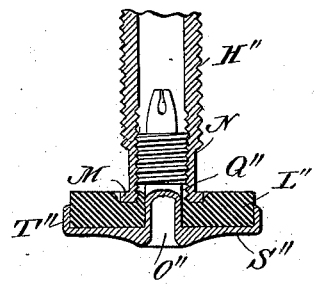
FIG. 8. FIG. 9.
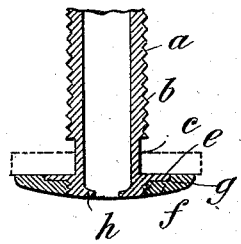
FIG. 10.
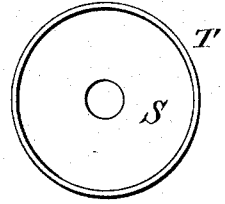
FIG. 5.
FIG. 6.
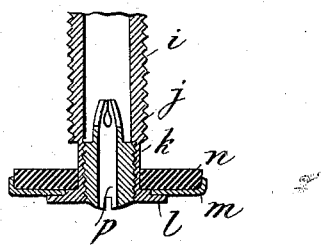
FIG. 11.
WITNESSES:
Fred White
Thomas F. Wallace
FIG. 7.
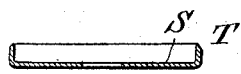
INVENTOR:
George H. F. Schrader,
By his Attorneys,
Arthur O. Fraser & Co.
THE NORRIS PETERS CO., PHOTO-LITHO., WASHINGTON, D. C.

UNITED STATES PATENT OFFICE.

GEORGE H. F. SCHRADER, OF NEW YORK, N. Y.

TIRE OR LIKE VALVE.

SPECIFICATION forming part of Letters Patent No. 565,573, dated August 11, 1896.

Application filed June 3, 1895. Serial No. 551,521. (No model.)

*To all whom it may concern:*

Be it known that I, GEORGE H. F. SCHRADER, a citizen of the United States, residing in the city, county, and State of New York, have invented certain new and useful Improvements in Tire or Like Valves, of which the following is a specification.

This invention relates to valves of the character applied to pneumatic tires, and especially to those of this class which are clamped radially to the tire, as distinguished from those which are enveloped by a special valve-tube to which they are fastened by clamping the latter around the sides of their tubular bodies.

Valves of the class to which my present improvements relate, usually have a small tubular screw-threaded body constituting a shell for the valve, and having a wide laterally-projecting flange at the inner or tire end, formed integrally with the body, which flange passes within the tire and is clamped against the inner wall thereof by a nut screwed on the valve-body against the outer wall of the tire. In making such valves it has been necessary to use rolled brass rods of a diameter equaling that of the flange or shoe, and cut down the rod to the desired diameter of the body. This has been an expensive method, and also has been subject to the disadvantage that possible leakage might exist through the fact that in rolled brass rods of large diameter there is a certain porosity which is avoided in rods of a smaller diameter, that is, those of a half inch or less in diameter.

My present invention aims to provide a valve which can be constructed of rods of small diameter, whereby the waste of material shall be reduced to the minimum, which shall be cheaper and less liable to leakage than heretofore, and which shall consist of two parts at the fastening end. To this end, in carrying out the preferred form of my improvements, I construct the valve-shell as a small tubular member, and provide a separate flange or shoe on its end, preferably making the shell or body externally screw-threaded, providing a tire-groove near its end and a shoulder below this groove, and an internal screw-thread at the lower end of the body, and I provide a flange consisting of a thin cup-shaped washer, a packing-washer on the latter and clamped between it and the valve-body, and a neck screwing into and closing the valve-body, having a reduced portion receiving the packing-washer, a head under the thin metal washer, and a tubular passage communicating with the interior of the valve. The reduced part of the neck is preferably of less diameter than the shoulder on the end of the body, so that when the neck is screwed in the latter the packing-washer can expand inwardly to the neck, thus insuring a tight joint.

In the accompanying drawings, which show certain modifications of my invention, Figure 1 is an axial section of a tire-valve embodying the preferred form of my improvements, a fragment of the tire being shown. Fig. 2 is a fragmentary side elevation of the lower end of the valve. Fig. 3 is a similar view of the lower end of the casing alone. Fig. 4 is a side elevation of the plug or neck removed. Fig. 5 is a plan view thereof looking from the bottom. Fig. 6 is a plan view of the flange or disk alone. Fig. 7 is a section thereof. Fig. 8 is a fragmentary axial section showing a modification. Fig. 9 is a similar view showing another modification. Fig. 10 is a like view showing another modification, and Fig. 11 is a like view showing still another modification.

Referring first to Figs. 1 to 7, inclusive, of the drawings, I will describe the preferred form of my improvements.

Let A represent the valve as a whole; B, the tire; C, the flange or shoe of the valve within the tire; D, the tire-nut on the valve; E, the valve proper; F, the spring therefor, and G the cap. The body H of the valve has an external screw-thread I, as usual, and an internal screw-thread J, and at its lower end passes through a hole K in the tire B, so that its flange C shall be within the latter. A washer L is usually carried on the flange to engage the tire.

According to my improvements the flange C and body H are separate parts coupled together, and certain improved features of construction are provided. Preferably the lower end of the body H is constructed with a shoulder M, having substantially the diameter of the outer thread I and extending from the inner thread J outwardly, and above this shoulder the body is constructed with an annular groove or recess N opposite, and which receives the adjacent edge of the tire. Above this groove the screw-thread I of the body can extend as usual to the cap end thereof. A tubular neck O, having an external screw-thread P, screws into the thread J of the body to close the latter, and couples the flange C thereto. This neck has a reduced portion or recess Q beneath its threaded portion P, and a head R beneath this recess. The recess Q receives the washer L, which is sprung over the thread P for this purpose. The head R receives and carries a thin disk S of metal or other suitable material, which preferably has an annular outturned flange T embracing the edge of the washer L and preventing its outward distortion. The lower side of the head R has wrench-faces or other suitable provisions by which it can be screwed into the body H. The recess Q is of such depth that its annular wall is considerably within the head M at the end of the body, so that the washer extends well within this head. At its inner end the plug or neck O has a reduced, slotted, and somewhat tapered end U, about which the spring F passes.

When the parts are assembled, the disk S is dropped over the thread P and seated on the head R. The washer L is then passed over the plug until it rests on the disk S and is beneath the shoulder between the recess Q and thread P. The valve E and spring F having been placed in the shell the plug is screwed into the shell until the washer L is clamped tightly between the lower end or head M of the body and the disk S and head R of the plug. The head M buries itself in the washer L until the shoulder at the lower side of the groove N is flush with or below the top face of the washer. In such screwing the washer and the disk S remain stationary relatively to the body H, the connection between the disk and the neck O being, preferably, a rotative or swivel connection, so that the washer is not distorted or subjected to torsional strain as the parts are coupled together. The neck can be screwed in until a thoroughly tight joint is obtained, and then the valve is ready to be applied to any tire. To do this, the flange C is passed through the hole K in the tire and the nut D screwed down until a tight joint is made between the tire and the washer L. If desired, the parts can be separated to substitute a new washer when necessary.

It will be seen that my invention provides an improved valve which can be economically constructed and easily and advantageously availed of, and it will be understood that the invention is not limited to the exact details of construction set forth as constituting its preferred form, but that it can be availed of according to such modifications as circumstances or the judgment of those skilled in the art may dictate without departing from the spirit of the invention.

In the modification shown in Fig. 8 the body (lettered H') has the neck N and head M shown in Fig. 1, but the plug O' has a smooth cylindrical wall Q' of the same diameter as its thread P', and the disk S' embraces this wall as it rests on the head R' of the plug, while the washer L' is clamped between the head and disk, as before.

In the modification shown in Fig. 9 the shell H'' is constructed as shown in Fig. 1, but the plug O'' and disk S'' are formed in one integral piece, the neck being constructed with a recess Q'' for the washer L'', and the disk with a flange T'', surrounding the washer.

In the modification shown in Fig. 10 the body (lettered a) has an outer screw-thread b, beneath this a groove c, terminated by a flange e, beneath which is a screw-thread f, onto which screws a separate disk g, which may be fixed in place in any suitable manner and serves as a separate flange for the body. The end of the body is sufficiently closed in this instance by inwardly-bent flange h.

In the modification shown in Fig. 11 the body i has external thread j, groove k below this thread, and flange or head l below this groove, and a disk m, carried on this head and having an upturned edge, carries a washer n, while the body is closed by a plug p. In the construction shown in Figs. 10 and 11 the packing-washer will occupy substantially the lower half of the groove on the body and the upper half thereof will serve as a tire-groove.

What I claim is—

1. In tire and like valves, a body having an external screw-thread, an annular groove below said thread and a head beyond said groove and adapted to pass within a tire, and a nut screwing on said body at the outside of the tire, in combination with a flange consisting of a separate piece connected to said body by a screw-threaded connection projecting within and adapted to engage the inner face of a tire.

2. In tire and like valves, the combination with a tubular body having an exterior screw-thread, a groove beyond said thread and a head beyond said groove adapted to pass within a tire, of a flange consisting of a separate piece of metal fastened to the inner end of said body, and a soft washer carried by said flange and clamped between the latter and the head of said body and adapted to embrace the inner side of a tire.

3. In tire and like valves, the combination with a tubular body having inner and outer screw-threads at its end and adapted to pass through a tire, of a flange for said body consisting of a separate metal disk connected thereto and adapted to embrace the inner side of a tire, and a plug having an external screw-thread screwing into said body, and a head engaging said flange and holding the latter toward said body.

4. In tire and like valves, a body having an internal screw-thread and adapted to pass through a tire, in combination with a plug having an external screw-thread engaging that of said body and screwing therein, and having a reduced portion beyond the end of said body, and a thin metal flange carried by said plug opposite the end of said body, and a washer carried by said flange and clamped between the latter and the end of said body by said plug.

5. In tire and like valves, a body H having an external screw-thread I and internal thread J, an external groove N, and an end beyond said groove adapted to pass within a tire, in combination with a plug O having an enlarged screw-thread P screwing into said thread J of said body, a reduced portion Q below said thread, carrying a lateral flange below said portion, and a washer L embracing the reduced portion of said plug, carried on said flange, and clamped between the latter and the end of said body.

6. In tire and like valves, a tubular body adapted to pass into a tire and having an external screw-thread, and a nut screwing on said body, in combination with a separate thin metal cup-shaped flange coupled to the inner end of said body.

In witness whereof I have hereunto signed my name in the presence of two subscribing witnesses.

GEORGE H. F. SCHRADER.

Witnesses:
GEORGE H. FRASER,
THOMAS F. WALLACE.